(12) United States Patent
Watters et al.

(10) Patent No.: US 7,207,118 B2
(45) Date of Patent: Apr. 24, 2007

(54) MULTI-PURPOSE STRAP FOR A LASER TRIPOD

(75) Inventors: Robert D Watters, Ottawa (CA); James D Marshall, Mallorytown (CA); Marcus W Bosch, Ottawa (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/979,954

(22) Filed: Nov. 2, 2004

(65) Prior Publication Data

US 2005/0091860 A1 May 5, 2005

Related U.S. Application Data

(60) Provisional application No. 60/516,900, filed on Nov. 3, 2003.

(51) Int. Cl.
*G01C 5/00* (2006.01)
(52) U.S. Cl. .................... 33/290; 33/DIG. 21
(58) Field of Classification Search .................. 33/262, 33/263, 275 R, 273, 290, DIG. 21
See application file for complete search history.

(56) References Cited

U.S. PATENT DOCUMENTS

| | | | | |
|---|---|---|---|---|
| 2,634,075 | A | | 4/1953 | Mayzel et al. |
| 3,471,234 | A | * | 10/1969 | Studebaker ............ 33/DIG. 21 |
| 3,836,986 | A | | 9/1974 | Kawazoe |
| 3,982,839 | A | * | 9/1976 | Schwartz ............... 33/DIG. 21 |
| 4,155,636 | A | * | 5/1979 | Reeberg ....................... 24/302 |
| 4,446,626 | A | * | 5/1984 | Grender et al. ........ 33/DIG. 21 |
| 4,675,948 | A | | 6/1987 | Bengtsson |
| 4,886,230 | A | | 12/1989 | Jones et al. |
| 5,481,809 | A | * | 1/1996 | Rooney ................. 33/DIG. 21 |
| 5,551,655 | A | * | 9/1996 | Berger ......................... 248/168 |
| 5,680,208 | A | | 10/1997 | Butler et al. |
| 6,028,665 | A | * | 2/2000 | McQueen ..................... 33/227 |
| 6,487,783 | B1 | * | 12/2002 | Thomas, Jr. ........... 33/DIG. 21 |
| 6,742,269 | B2 | * | 6/2004 | Kim et al. ............. 33/DIG. 21 |
| 2002/0008125 | A1 | | 1/2002 | Caputi |
| 2005/0207749 | A1 | * | 9/2005 | Barker et al. ............... 396/428 |

FOREIGN PATENT DOCUMENTS

| | | |
|---|---|---|
| DE | GM 73 04 483 | 2/1973 |
| DE | 30 43 043 A1 | 11/1980 |
| DE | 33 45 477 C2 | 12/1983 |
| DE | GM 84 06 882 | 3/1984 |
| DE | G 84 20 202.5 | 7/1984 |
| DE | 19807495 | 9/1999 |
| DE | GM 201 11 606 U1 | 7/2001 |
| DE | 101 50 339 C1 | 10/2001 |
| EP | 0 291 154 B1 | 3/1988 |
| EP | 0 582 559 B1 | 7/1993 |
| WO | WO 96/39063 | 6/1996 |

* cited by examiner

*Primary Examiner*—G. Bradley Bennett
(74) *Attorney, Agent, or Firm*—Harness, Dickey & Pierce, P.L.C.

(57) ABSTRACT

A multi-purpose strap for use with a laser tripod having a head portion and a base portion includes a flexible member, a first coupling component located at an end of the flexible member, and a second coupling component located at an opposite end of the flexible member. The flexible member when in a first configuration is adaptable to be coupled to the head portion using the first coupling component. The flexible member in a second configuration is also adaptable to be coupled to the tripod base using the second coupling member to form a shoulder strap.

14 Claims, 4 Drawing Sheets

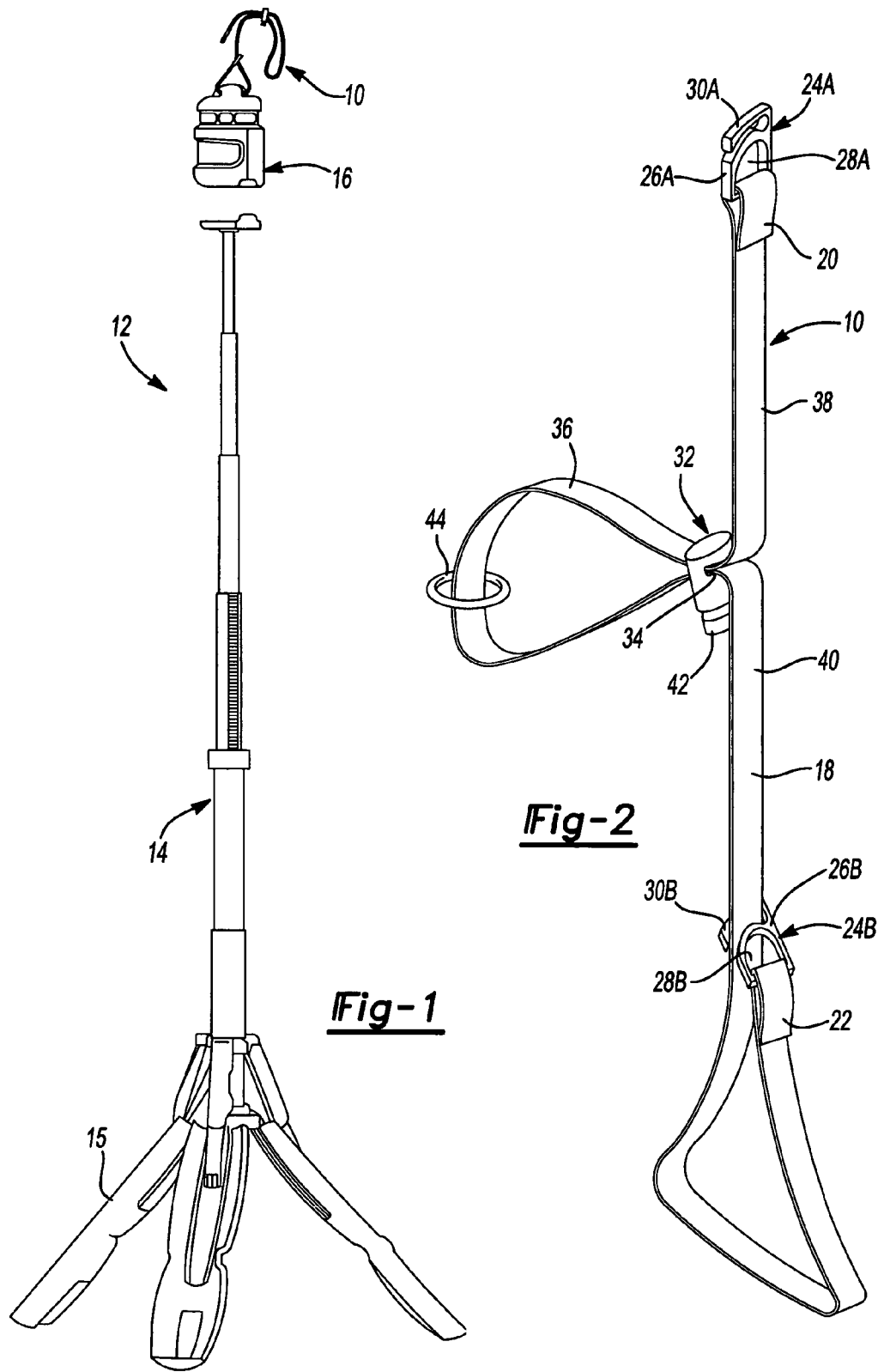

MULTI-PURPOSE STRAP FOR A LASER TRIPOD

CROSS-REFERENCE TO RELATED APPLICATIONS

This application claims the benefit of U.S. Provisional Application No. 60/516,900, filed on Nov. 3, 2003, the disclosure of which is incorporated herein by reference.

FIELD OF THE INVENTION

The present invention relates to a multi-purpose strap and more particularly to a multi-purpose strap for a laser tripod

BACKGROUND OF THE INVENTION

Laser tripods (e.g., devices having a tripod base for supporting a laser) are known in the art. Used in many applications throughout a broad range of industries, laser tripods are ubiquitous, yet externally useful. A recent advance in the field, however, is disclosed in U.S. Patent Application Ser. No. 60/516,704, filed Nov. 3, 2004, and hereby incorporated by reference in its entirety. The '704 patent application discloses a laser tripod having a laser head removable from a tripod base. Moreover, the tripod base has two configurations. In a first configuration, the legs of the tripod extend outwards to form a sturdy base. In the second configuration, the tripod legs fold to encapsulate the laser head portion of the laser tripod, thereby protecting the components located therein.

The added flexibility of the detachable head portion and the collapsible legs provides this laser tripod with a greater degree of flexibility, both in how and where the laser tripod is used and in how and where the laser tripod may be safely transported.

Accordingly, there remains a need in the art for a means of conveniently transporting the laser tripod while allowing the laser head portion to be used in various configurations.

SUMMARY OF THE INVENTION

A multi-purpose strap for use with a laser tripod having a head portion and a base portion includes a flexible member, a first coupling component located at an end of the flexible member, and a second coupling component located at an opposite end of the flexible member. The flexible member when in a first configuration is adaptable to be coupled to the head portion using the first coupling component. The flexible member in a second configuration is also adaptable to be coupled to the tripod base using the second coupling member to form a shoulder strap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a multi-purpose strap constructed in accordance with the principles of the present invention and illustrated in operative association with an exemplary laser tripod;

FIG. 2 is an enlarged perspective view of the multi-purpose strap shown in FIG. 1;

DETAILED DESCRIPTION OF THE PREFERRED EMBODIMENTS

The following description of the preferred embodiment(s) is merely exemplary in nature and is in no way intended to limit the invention, its application, or uses.

Figure 4:
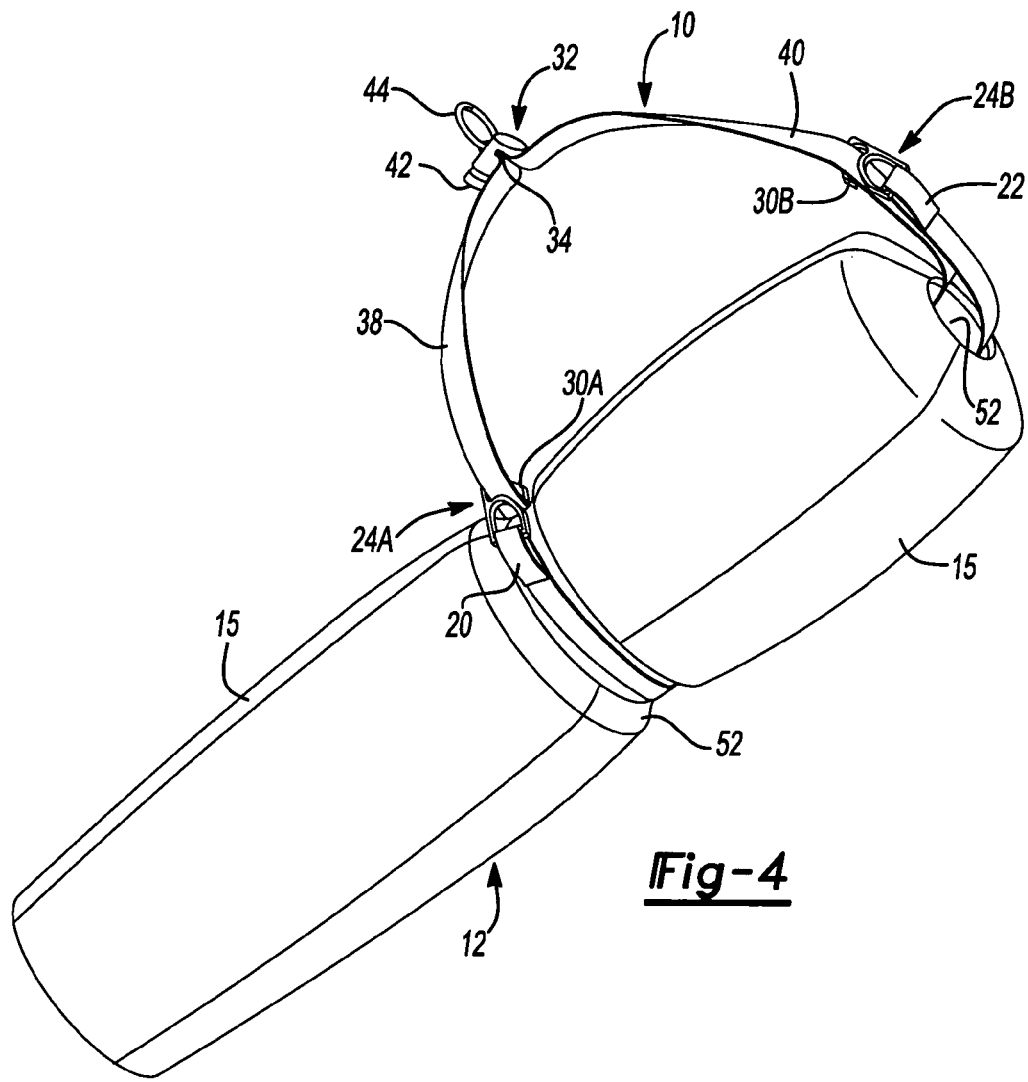
FIG. 4 is a perspective view of the multi-purpose strap in a carrying configuration and shown in operative association with the laser tripod in a stored position.

With reference to FIG. 1, a multi-purpose strap 10 constructed according to the principles of the present invention is illustrated in operative association with a laser tripod 12. The laser tripod 12 generally includes a collapsible tripod base 14 and a detachable head portion 16. The collapsible tripod base 14 includes a plurality of legs 15 that extend to form a tripod while in an extended position, as shown in FIG. 1, and collapse to form a stored configuration, as shown in FIG. 4. When in the stored configuration, the plurality of legs 15 completely enclose the collapsible tripod base 14 and the detachable head portion 16. The detachable head portion 16 includes therein a laser leveling device (not shown) that projects a visible laser line outwards therefrom.

Turning to FIG. 2, the multi-purpose strap 10 includes a flexible member 18 having a first end 20 and a second end 22. Preferably, the flexible member 18 is made from a weaved nylon material, although various other materials may be employed. A first connector 24A is coupled to the first end 20 of the flexible member 18. A second connector 24B is coupled to the second end 22 of the flexible member 18.

The first and second connectors 24A, 24B each include, respectively, a body 26A, 26B having a hole 28A, 28B formed therethrough. Flexible hooks 30A, 30B extend out from the bodies 26A, 26B. As will be described in greater detail below, the flexible hooks 30A, B are adapted to be engageable with the flexible member 18.

The multi-purpose strap 10 further includes an adjustment mechanism 32 mounted on the flexible member 18. The adjustable mechanism 32 includes a slot 34 formed therethrough that receives a portion of the flexible member 18, thereby dividing the flexible member 18 into a loop portion 36, a first arm 38 terminating in the first end 20, and a second arm 40 terminating in the second end 22. The adjustment mechanism 32 further includes a pitching mechanism (not shown) biased by a biasing member (not shown) gripping the flexible member 18, thereby fixing the size of the loop portion 36. By engaging a button 42 on the adjustment mechanism 32, the gripping mechanism (not shown) may be disengaged such that the flexible member 18 can slide within the slot 34, thereby adjusting the size of the loop portion 36.

A stop 44 (a ring in the particular example provided) is coupled to the loop portion 36 of the flexible member 18. The stop 44 is larger than the slot 34 of the adjustment mechanism 32, thereby preventing the flexible member 18 from being removed from the adjustment mechanism 32. In this way, the stop 44 will abut the adjustment mechanism 32 when the flexible member 18 is adjusted such that the loop portion 36 is at its smallest.

With reference to FIG. 3, the operation of the multi-purpose strap 10 will now be described. In many applications, it is desirable to hang the detachable head portion 16 separately from the collapsible tripod base 14 (FIG. 1). In this regard, the multi-purpose strap 10 can be used to hang the detachable head portion 16 from nearly any object, shown schematically as member 46. In this regard, the head portion 16 includes an aperture 48 sized to receive second connector 24B and second arm 40 therethrough. The flexible hook 30B is then deflected to receive the second arm 40 therein frictionally locking the second connector 24B to the second arm 40, and thereby supporting the head portion 16 at an end of the multi-purpose strap 10. To hang the head portion 16, the first end 20 is fixed to the member 46. In the particular example provided, a nail 50 is driven through the hole 28A of the first connector 24A. The height at which the head portion 16 hangs below the member 46 can be adjusted by adjusting the size of the loop portion 36 using the adjustment mechanism 32.

Figure 3A:
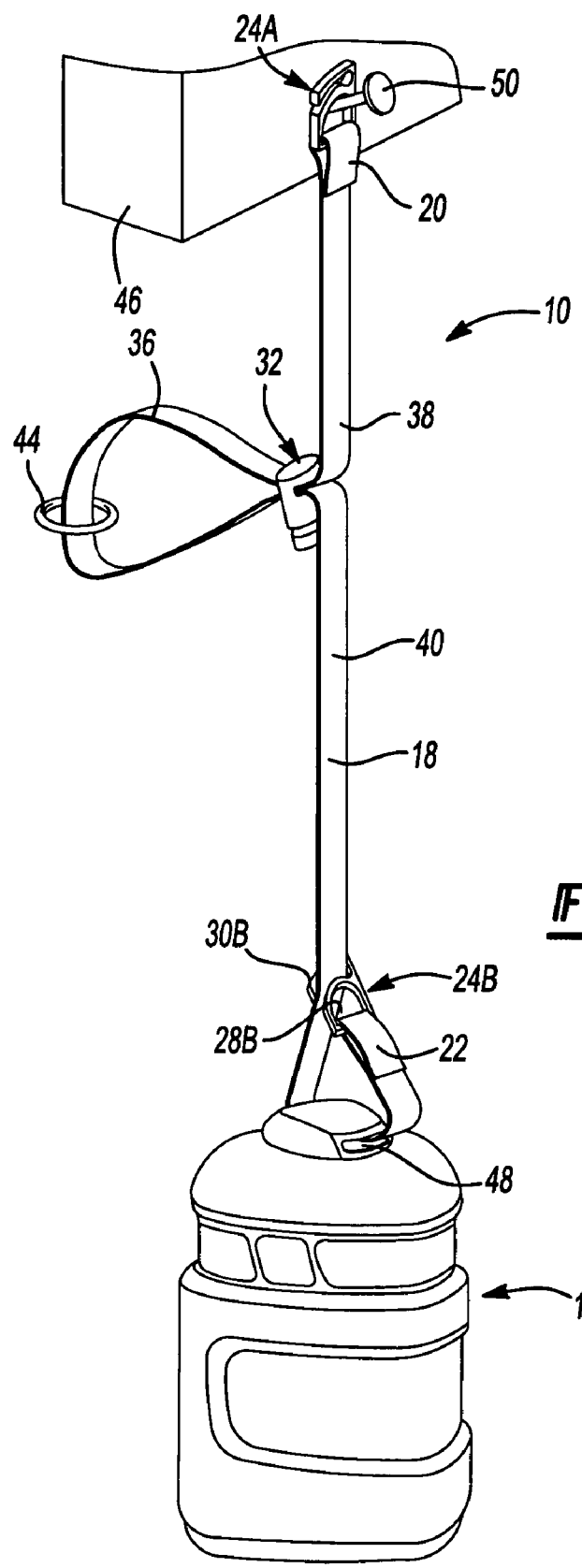
FIG. 3A is a perspective view of the multi-purpose strap in a first configuration of the strap and shown in operative association with a detachable head portion of the laser tripod.
Figure 3D:
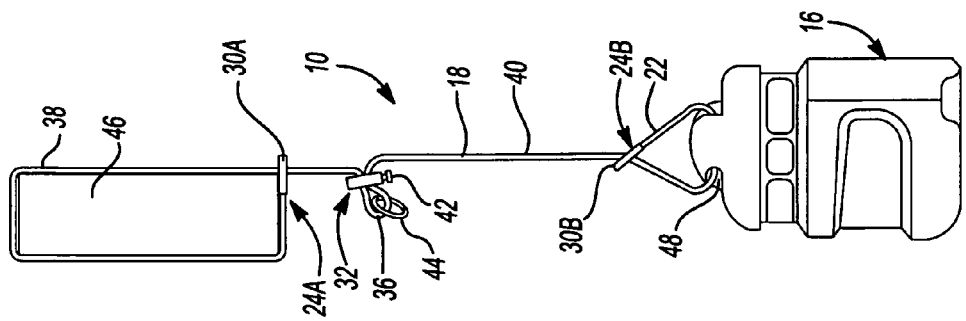
FIG. 3D is a side view of the multi-purpose strap in a third configuration and shown in operative association with the detachable head portion of the laser tripod.
Figure 3C:
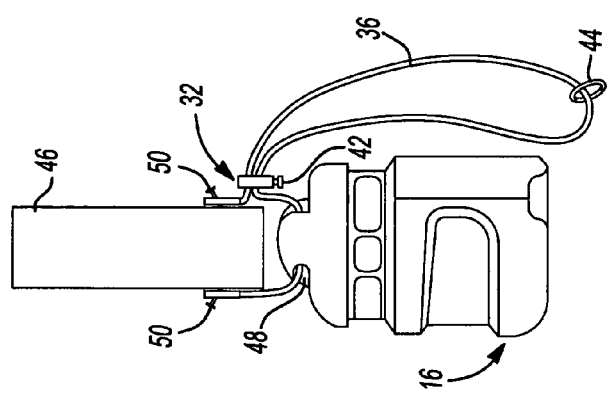
FIG. 3C is a side view of the multi-purpose strap in the second configuration adjusted such that the detachable head portion is hanging at a different height.
Figure 3B:
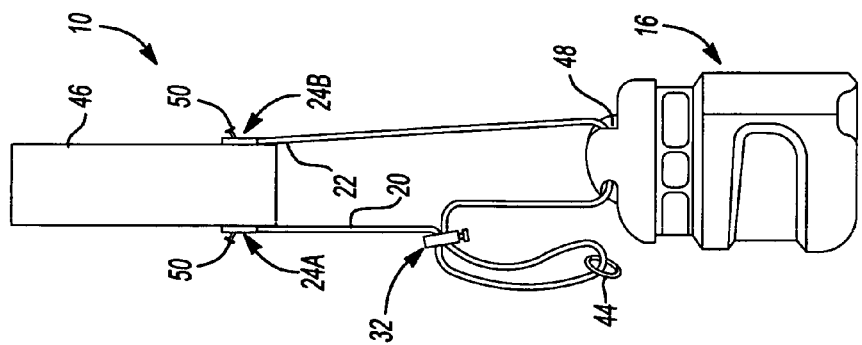
FIG. 3B is a side view of the multi-purpose strap in a second figuration and shown in operative association with the detachable head portion of the laser tripod.

With reference to FIG. 3B, an alternate configuration of hanging the head portion 16 is illustrated. In this alternate configuration, the multi-purpose strap 10 extends through the aperture 48 formed on the head portion 16 and both the first end 20 and the second end 22 are fixed to the member 46. Again, in the particular example provided, nails 50 are driven through the holes 28A, 28B (FIG. 2). Moreover, as illustrated in FIG. 3C, the hanging height of the head portion 16 may be adjusted by increasing the size of the loop portion 36 by engaging the button 42 of the adjustment mechanism 32, allowing the flexible member 18 to slide relative to the adjustment mechanism 32.

Turning now to FIG. 3D, another hanging configuration of the multi-purpose strap 10 is illustrated. The second end 22 and second connector 24B extend through the aperture 48 of the head portion 16 and the flexible hook 30B is coupled to the second arm 40 of the flexible member 18, thereby securing the head portion 16 to the multi-purpose strap 10. The multi-purpose strap 10 is fixed to the support member 46 by wrapping the first arm 38 around the support member 46 and coupling the first connector 24A to the first arm 38 using the flexible hook 30A. Again, the height of the hanging head portion 16 may be adjusted by engaging the button 42 on the adjustment mechanism 32 thereby adjusting the size of the loop portion 36. In this configuration, no extra fasteners (e.g., the nails 50) are required to attach the multi-purpose strap 10 to the support member 46.

It should be noted that while in the preceding paragraphs, the multi-purpose strap 10 has been illustrated as being coupled to the support member 46, it should be appreciated that the multi-purpose strap 10 may be attached to any given surface, either through the use of fasteners or through the use of the multi-purpose strap 10 itself. Moreover, while nails 50 have been illustrated for use as fasteners, various other fastening devices may be employed such as, for example, screws, adhesives, etc.

With reference to FIG. 4, the multi-purpose strap 10 is shown in operative association with the laser tripod 12. The laser tripod 12 is in a collapsed and stored configuration. In this stored configuration, the legs 15 fully enclose the head portion (FIG. 1). A groove 52 is formed in the plurality of legs 15 that entirely circles the laser tripod 12. The first arm 38 of the flexible member 18 wraps around the plurality of legs 15 in the groove 52 and the first connector 24A is coupled to the first arm 38 using the flexible hook 30A. The second end 22 of the flexible member 18 extends through a hole 54 in the plurality of legs 15 and extends through the aperture 48 of the head portions 16 (FIG. 3A). The second connector 24B is then coupled to the second arm 40 using the flexible hook 30B. In this way, the multi-purpose strap 10 is secured at both its ends to the laser tripod 12 forming a shoulder harness that allows a user to carry the laser tripod 12 using only the multi-purpose strap 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser tripod having a multi-purpose strap comprising:
a tripod base with a plurality of legs extending therefrom;
a laser head detachably mounted on said base; and
a multi-purpose strap comprising:
a flexible member having first and second free ends, said first free end inserted through a slot in said laser head;
a first coupling component located at said first free end thereof; and
a second coupling component located at said second free end thereof;
said first and second coupling components each include a body with an aperture and a hook portion extending from said body, wherein said multi-purpose strap is configurable to hang said laser head and configurable to act as a shoulder strap for said laser tripod using said first and second coupling members.

2. The laser tripod having a multi-purpose strap according to claim 1, wherein said second free end of said flexible member is wrapped around said tripod base.

3. The laser tripod having a multi-purpose strap according to claim 1, wherein said flexible member is attached to said laser head when said laser head is detached from said tripod base.

4. The laser tripod having a multi-purpose strap according to claim 2, wherein said second coupling component engages a medial portion of said flexible member located between said first and second ends.

5. The laser tripod having a multi-purpose strap according to claim 1, wherein at least one of said first and second coupling components is formed from a flexible material.

6. The laser tripod having a multi-purpose strap according to claim 1, wherein each of said first and second coupling components is configured to receive a member for coupling thereto.

7. A laser level, comprising:
a housing including an aperture therein;
a laser leveling light disposed in said housing for projecting a visible laser line outwards therefrom; and
a strap engaging said aperture in said housing for suspending said housing, said strap including first and second free ends extending from opposite sides of said aperture, a first connector coupled to said first free end and a second connector coupled to said second free end, each of said first and second connectors include a base portion with an aperture therethrough and a hook portion extending from said base portion, said hook portion being configured to selectively engage a medial portion of said strap.

8. The laser level according to claim 7, wherein said length adjustment mechanism engages a loop portion in said strap and is capable of engaging said flexible member to adjustably vary a size of said loop portion.

9. The laser level of claim 7, wherein at least one of said first and second connectors is formed from a flexible material.

10. The laser level of claim 7, wherein each of said first and second connectors is configured to receive a member for coupling thereto.

11. A laser tripod comprising:
   a tripod base with a plurality of legs extending therefrom;
   a laser head detachably mounted to said base; and
   a strap coupled to said laser head, said strap having a first free end with a first coupling component fixed thereto, said first coupling component including a body with an aperture and a hook portion extending from said body and configured to selectively engage each of an external structure and a medial portion of said strap.

12. The laser tripod of claim 11, wherein said first end is removably coupled to said tripod base.

13. The laser tripod of claim 11, wherein said strap includes a second free end having a second coupling component fixed thereto, said second coupling component including a body with an aperture and a hook portion extending from said body and configured to selectively engage one of an external structure and a medial portion of said strap.

14. The laser tripod of claim 13, wherein said second coupling component is formed from a flexible material.

* * * * *